(12) United States Patent
Srivastava et al.

(10) Patent No.: US 11,244,205 B2
(45) Date of Patent: Feb. 8, 2022

(54) GENERATING MULTI MODAL IMAGE REPRESENTATION FOR AN IMAGE

(71) Applicant: Microsoft Technology Licensing, LLC, Redmond, WA (US)

(72) Inventors: Sumit Srivastava, Uttar Pradesh (IN); Suhit Sinha, West Bengal (IN); Rushi P. Bhatt, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/370,509

(22) Filed: Mar. 29, 2019

(65) Prior Publication Data
US 2020/0311467 A1 Oct. 1, 2020

(51) Int. Cl.
*G06K 9/62* (2006.01)
*G06K 9/34* (2006.01)
*G06N 20/00* (2019.01)
*G06N 3/08* (2006.01)

(52) U.S. Cl.
CPC ............ *G06K 9/627* (2013.01); *G06K 9/344* (2013.01); *G06K 9/623* (2013.01); *G06N 3/08* (2013.01); *G06N 20/00* (2019.01); *G06K 2209/01* (2013.01)

(58) Field of Classification Search
CPC ........ G06K 9/627; G06K 9/344; G06K 9/623; G06K 2209/01; G06N 20/00; G06N 3/08
See application file for complete search history.

(56) References Cited

U.S. PATENT DOCUMENTS

| | | | |
|---|---|---|---|
| 2016/0323281 A1* | 11/2016 | Griesmeyer | G06N 20/00 |
| 2018/0173996 A1* | 6/2018 | Lim | G06K 9/6215 |
| 2018/0204111 A1* | 7/2018 | Zadeh | G06N 3/0436 |
| 2019/0005324 A1* | 1/2019 | Anisimovskiy | G06N 3/08 |
| 2019/0294874 A1* | 9/2019 | Orlov | G06K 9/00442 |
| 2021/0103622 A1* | 4/2021 | Fan | G06N 5/04 |
| 2021/0294840 A1* | 9/2021 | Lee | G06F 16/635 |

OTHER PUBLICATIONS

Wang, et al., "Learning Deep Structure-Preserving Image-Text Embeddings", In Proceedings of IEEE Conference on Computer Vision and Pattern Recognition, Jun. 27, 2016, 10 Pages.

Wang, et al., "Learning Two-Branch Neural Networks for Image-Text Matching Tasks", In Repository of arXiv: 1704.03470, May 1, 2018, pp. 1-14.

* cited by examiner

*Primary Examiner* — Joshua L Schwartz
(74) *Attorney, Agent, or Firm* — NDWE, LLP.

(57) ABSTRACT

Technologies for generating a multi-modal representation of an image based on the image content are provided. The disclosed techniques include receiving an image, to be classified, that comprises one or more embedded text characters. The one or more embedded text characters are identified from the image and a first machine learning model is used to generate a text vector that represents a numerical representation of the one or more embedded text characters. A second machine learning model is used to generate an image vector that represents a numerical representation of the graphical portion of the image. The text vector and the image vector are used as input to generate a multi-modal vector that contains information from both the text vector and the image vector. The image may be classified into one of a plurality of image classifications based upon the information in the multi-modal vector.

20 Claims, 5 Drawing Sheets

GENERATING MULTI MODAL IMAGE REPRESENTATION FOR AN IMAGE

TECHNICAL FIELD

The present disclosure relates to image representation and, more specifically, to identifying text content and visual content from an image and classifying the image based on the identified text content and visual content for image classification, image search, and duplicate image detection tasks.

BACKGROUND

Conventional image classifiers may be used to classify images into categories so that systems may be able to filter out unwanted images from being displayed to users. For example, conventional image classifiers may classify an image as a not suitable for work (NSFW) image or as a meme image and may filter out NSFW and meme images from a user's content feed. By filtering out images based on their classification, a content provider may be able to prevent unwanted exposure to inappropriate content.

Conventional image classifiers may use multiple sources of input to help classify an image. For instance, a conventional image classifier may receive the image itself as input as well as additional descriptive text, such as alternative text, as a second input. The additional descriptive text may describe the image and may give context to the image, which may be used to more accurately classify the image. Additional descriptive text may be provided by the publisher of the image or by other third-party entities. If, however, the publisher of the image and/or third-party entities do not provide the additional descriptive text, then the conventional image classifiers may not be able to accurately classify images using the image content alone. Challenges exist when classifying images using limited input data, such as the image alone.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
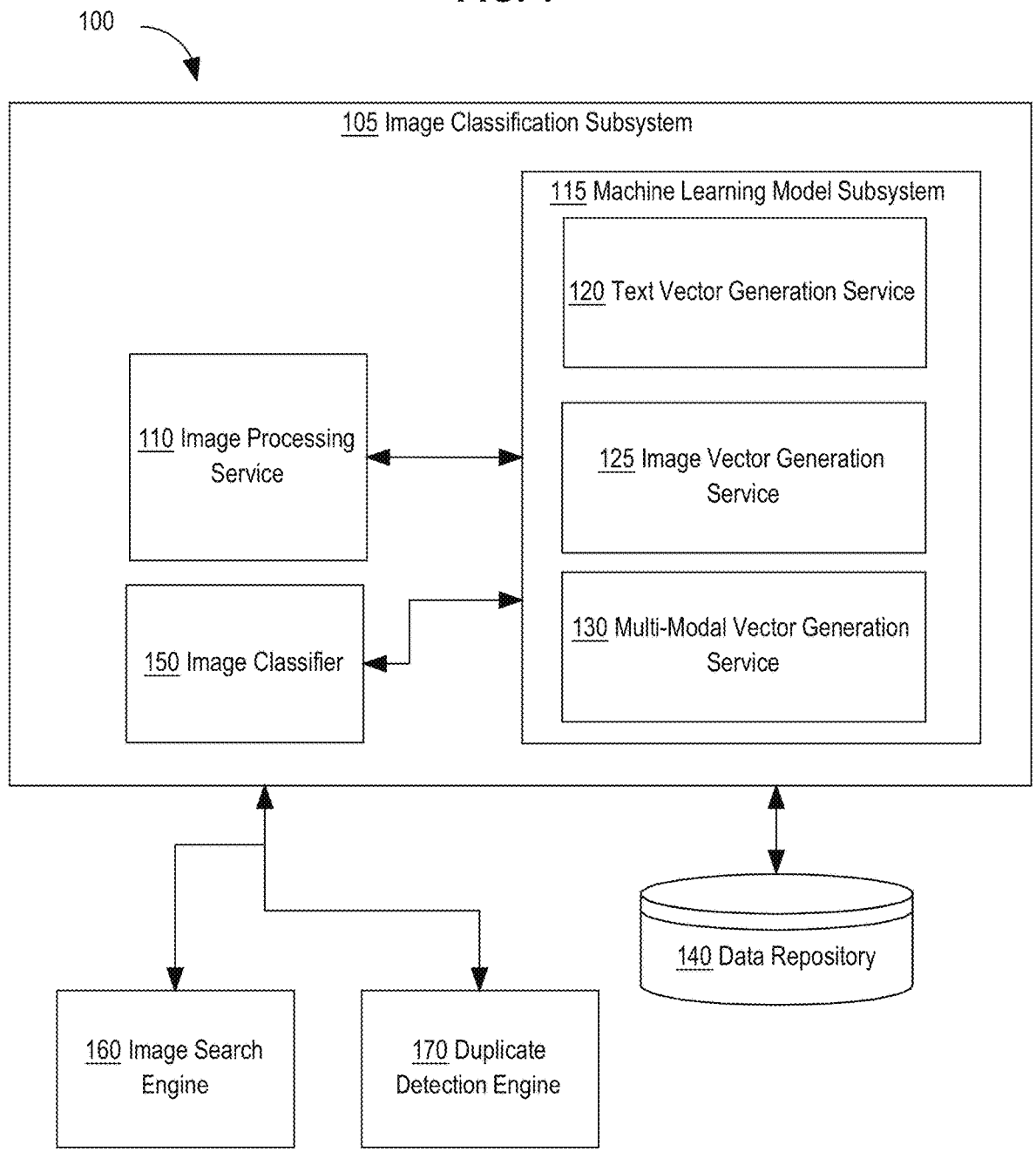
FIG. 1 is a block diagram that depicts system for classifying an image containing embedded text characters, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As disclosed herein, classifying images based on the image content itself is improved by adding technology that implements a particular approach of analyzing the image content for text characters and separately analyzing the text characters as well as the graphical features that make up the image to determine an image classification for the corresponding image. One particular approach may receive an image that includes one or more embedded characters, which are identified from the image. A first machine learning model may be used to determine a text vector. The text vector may represent numerical representations of the one or more embedded characters. A second machine learning model may be used to determine an image vector. The image vector may represent numerical representations of the image. The text vector and the image vector may be processed to generate a multi-modal vector that represents information from the text vector and the image vector. Based on the multi-modal vector, the image may be classified into one of a plurality of image classifications. Image classifications may be used by downstream systems to determine whether images are suitable for presentation to users. For instance, if an image is classified as promotional or NSFW, then a content management platform may omit presenting the image to users within a user feed or within a notification of new content.

The disclosed approaches provide advantages over conventional solutions by extracting embedded text characters from the image itself and analyzing the embedded text characters as well as analyzing the image content in order to determine an image classification for the provided image. Conventional solutions rely on additional text descriptions, provided by the publisher of the image or by a third-party entity, in conjunction with analyzing the image content to accurately classify an image. However, in the absence of the additional text descriptions, the conventional solutions may not accurately classify the provided image when relying on the image content alone. The disclosed approaches provide greater efficiency and accuracy when classifying an image based upon only the image itself. By extracting and analyzing embedded text characters from the image itself, the disclosed approaches are able to more accurately classify the image using analysis of the embedded text characters as well as analysis of the graphical portion of the image. For example, with the disclosed approaches, mis-classifications of images may be reduced and as a result additional processing resources that may be used to reclassify the mis-classified images may be reduced.

System Overview

FIG. 1 is a block diagram that depicts system 100 for classifying an image containing embedded text characters, in an embodiment. System 100 includes an image classification subsystem 105, a data repository 140, an image search engine 160, and a duplicate detection engine 170. Although a single image classification subsystem is depicted, system 100 may include additional image classification subsystems.

In an embodiment, the image classification subsystem 105 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to classify images for content filtering, images searches, and near duplicate image detection.

In an embodiment, the image classification subsystem 105 may include an image processing service 110, a machine learning model subsystem 115, and an image classifier 150. In an embodiment, the image processing service 110 may receive images for classification that contain embedded text characters. The image may be received from end-users who may upload one or more images for classification or from content providers, such as advertisers who upload advertising images or other promotional content.

Embedded text characters may refer to text, such as letters, numbers, and words, that has been embedded into the image itself. For example, a word or phrase that has been superimposed onto an image may be considered embedded text characters. The image processing service 110 may receive the image that contains the embedded text characters and may extract the embedded text from the image content. For example, the image processing service 110 may implement optical character recognition (OCR) techniques to identify features, such as lines, shapes, and other marks, within the image, that may represent text characters that make up words.

In an embodiment, the machine learning model subsystem 115 may receive the embedded text as well as the graphical content from the image and generate a multi-modal vector that represents image information determined from the embedded text and graphical content of the received image. The machine learning model subsystem 115 may include a text vector generation service 120, an image vector generation service 125, and a multi-modal vector generation service 130.

In an embodiment, the text vector generation service 120 may determine a text vector, from the embedded text of the image, that comprises numerical values for the embedded text. A text vector may represent a word, set of words, or a string of characters identified from the embedded text. The text vector may be a vector within a specific vector space where vectors representing similar words or phrases may be located close to each other within the vector space and vectors representing dissimilar words or phrases may be located far from each other within the vector space. Input for the text vector generation service 120 may include the one or more embedded text characters. The text vector generation service 120 may provide, as output, the generated text vector.

The text vector generation service 120 may implement a machine learning model to generate text vectors within a text vector space that contains multiple dimensions. The text vector space may be defined as a space comprising text vectors. Within the text vector space, each unique string of text, such as a set of words or a phrase, may be assigned a corresponding vector within the text vector space. Text vectors are positioned, within the text vector space, such that words that share common contexts are located close in proximity to one another. Examples of the machine learning model implemented by the text vector generation service 120 may include commercially available model such as Word2vec and Glove. Word2vec is a commercially available deep learning model that implements word embedding configured to generate vector representations of words that capture the context of the word, semantic and syntactics properties of the word, and relations to other words.

Glove is a commercially available unsupervised learning algorithm configured to generate vector representations of words. Glove may be trained using aggregated word-to-word co-occurrence statistics from a corpus to generate a model that contains linear substructures of a word vector space. For example, the word vector space may include vectors for words such as king, queen, and prince, that are close in proximity based upon the relation between words that describe royal titles. Other examples of vectors that are close in proximity may include closely related words such as frog, toad, lizard, and any other words representing species related to a frog.

In an embodiment, the machine learning model implemented by the text vector generation service 120 may be trained using a text corpus. A text corpus may represent a structured set of text for which statistical analysis for word-to-word co-occurrences may be performed. The inputted text corpus may be analyzed by the machine learning model to determine co-occurrence statistics. Once trained, the machine learning model may receive input text characters, such as a string of words, and may output a multi-dimension text vector of values representing each of the words identified within the inputted text characters.

In an embodiment, the image vector generation service 125 may determine an image vector, from the graphical content of the received image. The image vector is generated based on numerical values for pixels that make up the image. The generated image vector is one vector of a set of image vectors that make up an image vector space. In an embodiment, the image vector generation service 125 may implement a machine learning model configured to generate an image vector as a representation of the graphical content of the image. Example machine learning algorithms include artificial neural networks, deep neural networks, convolution neural networks, recursive neural networks, classifiers, and other supervised or unsupervised machine learning algorithms. The image vector generation service 125 may implement any suitable machine learning algorithm or architectures. In an embodiment, the machine learning model is a convolutional neural network (CNN). Examples of CNN architectures that may be implemented include, but are not limited to, Inception-V3, Inception-Resnet, and Inception-v4.

A neural network is a machine learning technique that utilizes a network of learning units, also referred to as neural nodes. The neural nodes are trained to convert an input, such as an image, into corresponding output signals, such as a feature measurement. In a convolutional neural network, the neural nodes are arranged in a plurality of layers. Each node receives input from one or more nodes in layers below it and passes data to one or more nodes in layers above it. Each neural node may be associated with a weight that is applied to the data it receives to generate output to pass to a subsequent neural node. Each neural node may also be associated with a threshold value, wherein output is passed to one or more subsequent nodes if the threshold value is met.

In an embodiment, the multi-modal vector generation service 130 may generate a multi-modal vector based upon input that includes a text vector and an image vector. The output from the multi-modal vector generation service 130 is a multi-modal vector that includes data derived from the text vector and the image vector. In an embodiment, the multi-modal vector generation service 130 may generate the multi-modal vector that includes each of the values from the corresponding text vector and image vector. The multi-modal vector generation service 130 may generate the multi-modal vector by performing a concatenation of the image vector and the text vector. For instance, if the image vector includes values $[V_1, V_2, \ldots V_N]$ and the text vector includes values $[T_1, T_2, \ldots T_N]$, then a concatenation of the two vectors may generate the multi-modal vector as $[V_1, V_2, \ldots V_N, T_1, T_2, \ldots T_N]$. The multi-modal vector may include values corresponding to multiple vector spaces, such that the set of image vector values $(V_1, V_2, \ldots V_N)$ correspond to the image vector space and the set of text vector values $(T_1, T_2, \ldots T_N)$ correspond to the text vector space.

In another embodiment, the multi-modal vector generation service 130 may implement a machine learning model configured to model a common vector space for modeling information of the image represented by the text vector and the image vector. In one example an autoencoder neural network may be implemented. An autoencoder neural network is an unsupervised deep machine learning algorithm that applies backpropagation for setting target values equal to input. That is, the autoencoder neural network learns how to generate a compressed representation of given data that when used to reconstruct the input image may generate output that is nearly identical to the input image. The autoencoder neural network may include multiple layers including, but not limited to, an input layers, a code layer, and output layers.

Figure 2:
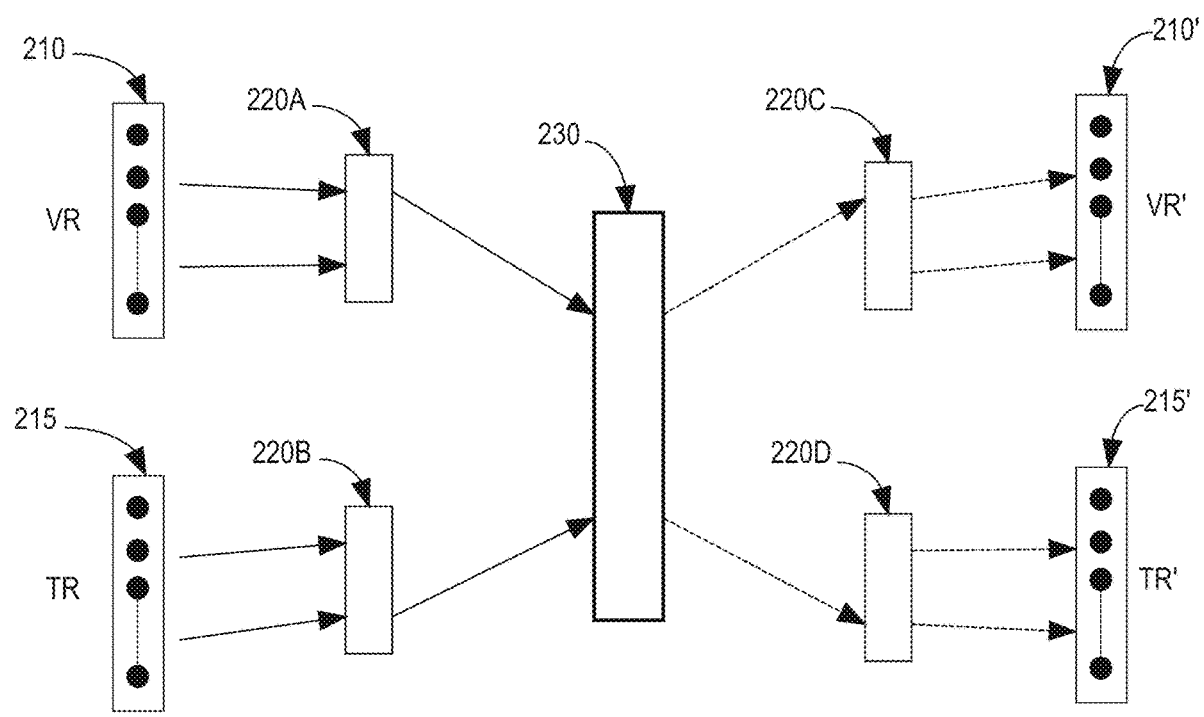
FIG. 2 depicts an example visual representation of an autoencoder neural network, including input data and generated training output data, in an embodiment.

FIG. 2 depicts an example visual representation of an autoencoder neural network, including input data and generated training output data. Autoencoder 205 includes an input layer, a code layer, and an output layer. Input for the autoencoder 205 is input image vector 210 and input text vector 215. The input image vector 210 may represent output generated from the image vector generation service 125. The input text vector 215 may represent output generated from the text vector generation service 120. Each of the dots representing the input image vector 210 and the input text vector 215 represent values for dimensions within the corresponding vector space. For example, the first dot within input image vector 210 may represent a float value for the first dimension within the vector space for the input image vector 210.

Fully connected layers 220A and 220B may represent one or more hidden layers within the autoencoder 205. Hidden layers represent layers within the input layer and the output layer configured to learn different aspects about data by minimizing an error/cost function. Each hidden layer is trained based on the input data and the produced training output data. Multiple hidden layers may be used in order to increase accuracy based upon the input training dataset. For instance, if the input training dataset is not very complex then a single hidden layer may provide better prediction accuracy. Conversely, if the input training dataset is more complex, such as each image has more lines, colors, or detail, then multiple hidden layers may provide increased accuracy. The number of hidden layers may be adjusted based upon the input data and the input training dataset.

The code layer may represent a multi-dimensional vector containing parameter values that represent information decoded from the input vectors. Multi-modal representation 230 may represent multi-modal vector with values representing dimensions within a common vector space that incorporates information from both the input text vector 215 and the input image vector 210. During model training, upon generating the multi-modal representation 230, the autoencoder 205 may adjust weights of each of the number of layers and the size of each respective layer defined at an initial stage. Adjusting the size of a layer may include adjusting the number of neural nodes within the layer. For example, weights of fully connected layers 220C, 220D may be adjusted to generate image training vector 210' and text training vector 215'. Image training vector 210' and text training vector 215' are generated vectors that respectively represent compressed copies of the input image.

A loss function may be used during model training to determine how effective the autoencoder 205 is in reconstructing the input image. In an embodiment, the autoencoder 205 may calculate the loss using an L2 loss function, calculated as:

$$L2loss = (VR' - VR)^2 + (TR' - TR)^2$$

where: VR' represents the image training vector 210', VR represents the input image vector 210, TR' represents the text training vector 215', and TR represents the input text vector 215.

The L2 loss value may then be normalized with respect to the dimensionality of the input image vector 210 (VR) and the input text vector 215 (TR). For example, if the total number of dimensions between the input image vector 210 and the input text vector 215 is 2348 (2048 for the image vector and 300 for the text vector), then normalizing the value of the L2 loss may be performed by dividing the L2 loss value by the total number of dimensions (2348). The normalized value of L2 loss may be used to train weights of the autoencoder 205. In an embodiment, once the autoencoder 205 is trained, the autoencoder 205 may be used to generate a multi-modal vector represented by multi-modal representation 230.

In an embodiment, the image classifier 150 may assign a classification to an image based upon a generated multi-modal vector representing the image to be classified. The image classifier 150 may implement a machine learning model, such as a neural network, that has been trained using a plurality of image classifications and associated multi-modal vectors for the respective plurality of image classifications. The image classifier 150 may access the plurality of image classifications stored in the data repository 140 and retrieve classification properties, such as multi-modal vectors, associated with each of the plurality of image classifications. The image classifier 150 may then train the machine learning model to classify new images using associated multi-modal vector values of the new images. The image classifier 150 may receive, as input, a multi-modal vector of the image and determine a matching image classification of the plurality of image classifications based on the input multi-modal vector values. Upon determining a matching image classification based on the multi-modal vector of the image, the image classifier 150 may assign the matching image classification to the image.

In an embodiment, classification of images, by the image classifier 150, may be used by content management platforms to determine whether images are appropriate to present to users within users' feeds. Content management platforms may refer to systems that determine how and when specific content is presented to users. For example, a content management platform may determine which content, such as images, are presented in a user's feed based upon associated classifications of the images. For example, if the image classifier 150 classifies an image as NSFW, then the content management system may omit the image from a user's feed. In other examples, if the image classifier 150 classifies a second image as promotional, then the content management system may determine whether the second image should be presented within a user's feed based upon the user's preferences, such as whether the user prefers to consume promotional content or whether the user prefers not to see images classified as promotional.

In an embodiment, the data repository 140 may represent data storage configured to store images, image classifications, image properties associated with the image, including, but not limited to, sets of text vectors, sets of image vectors, and sets of multi-modal vectors.

In an embodiment, the image search engine 160 may represent a search engine configured to search for images based upon search criteria that includes a set of keywords. The image search engine 160 may receive keywords as search input and may use the keywords to search for relevant images that match the search criteria. Determining matches may be based upon comparing the keywords to assigned image classifications for searchable images. If matches are found, then the image search engine 160 may provide a result set of matching images.

In an embodiment, the duplicate detection engine 170 may represent a near duplicate image detection service configured to determine whether an image is a near duplicate of another identified image. The duplicate detection engine 170 may be implemented to determine whether an input image contains only slight modifications when compared to other images that have been previously classified. The duplicate detection engine 170 may be useful when determining whether an image is simply a slight modification of another image that may have been marked as an inappropriate image or an otherwise undesirable image.

In an embodiment, the duplicate detection engine 170 may implement a machine learning model configured to determine near duplicates of images based upon image property information. One example of image property information may be an associated multi-modal vector. For example, the duplicate detection engine 170 may retrieve a plurality of images, with associated multi-modal vectors, from the data repository 140. The duplicate detection engine 170 may train a machine learning model, using the multi-modal vectors of the plurality of images, to detect whether an input image is a near duplicate of one of the plurality of images based upon an associated multi-modal vector of the input image. In one example, the trained machine learning model may use cosine similarities between the multi-modal vector associated with the input image and the multi-modal vectors of the plurality of images to determine whether the input image is a duplicate or near duplicate of one of the plurality of images. In other examples, the trained machine learning model may be configured to use any other vector comparison technique to determine whether the input image is a duplicate or near duplicate of one of the plurality of images.

Processing Overview

Figure 3:
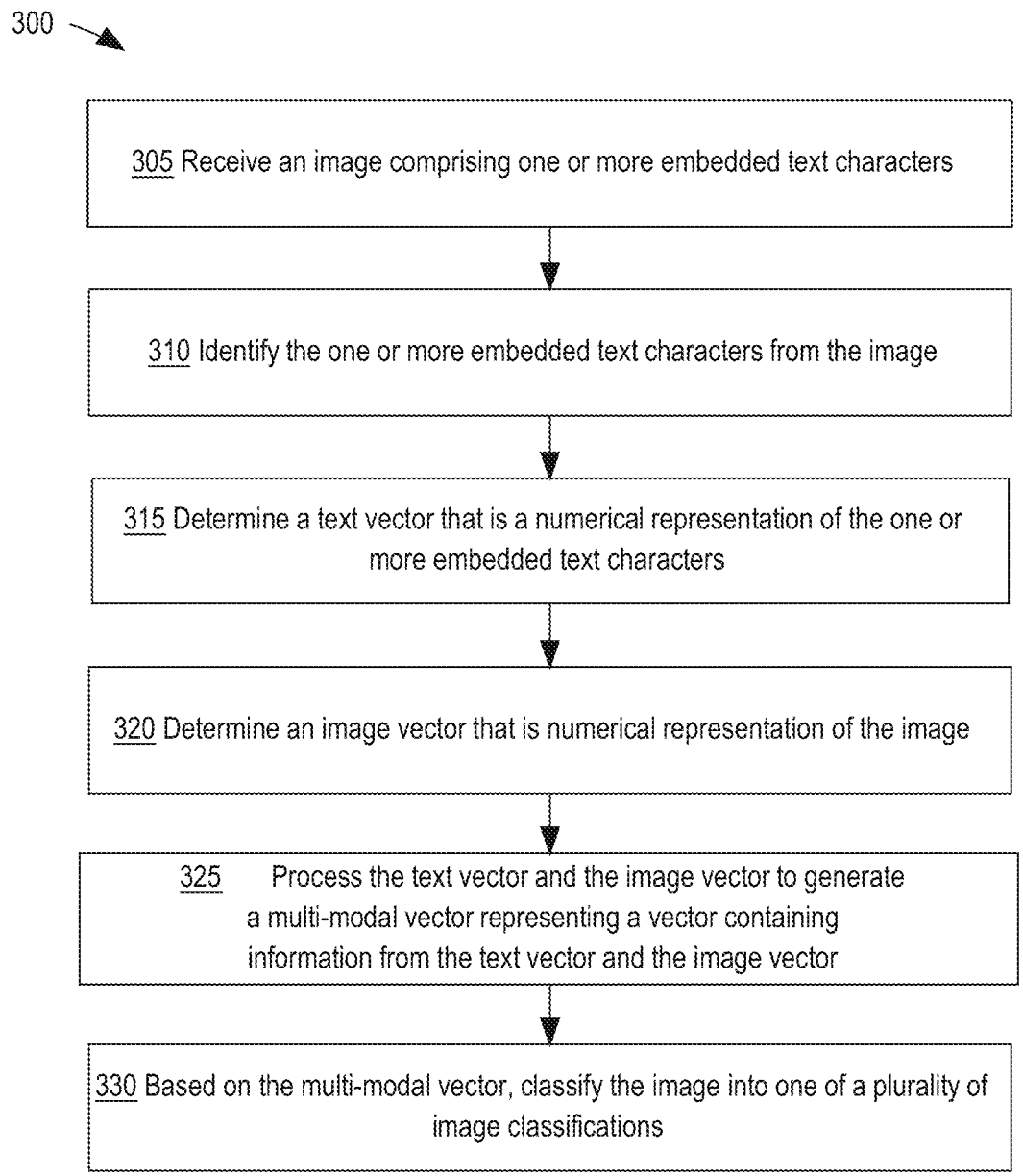
FIG. 3 depicts a flowchart for determining a classification of an image that contains embedded text, in an embodiment.

FIG. 3 depicts an example flowchart for determining a classification of an image that contains embedded text. Process 300 may be performed by a single program or multiple programs. The operations of the process as shown in FIG. 3 may be implemented using processor-executable instructions that are stored in computer memory. For purposes of providing a clear example, the operations of FIG. 3 are described as performed by the image classification subsystem 105 and its components. For the purposes of clarity process 300 is described in terms of a single entity.

In an embodiment, the image classification subsystem 105 may perform the operations of process 300 on one or more images.

In operation 305, process 300 receives an image comprising one or more embedded text characters. In an embodiment, the image processing service 110 may receive an image for classification that may include one or more embedded text characters. The image processing service 110 may receive a file of the image from an internal or external server, an end-user, a client device, or other computing device. The file may be received via a direct upload to a specified network folder or website, from an email that was sent to a specific email account associated with the image classification subsystem 105, or from a network location associated with a network storage service, such as Box, Google Drive, Drop Box, or any other network storage service.

In operation 310, process 300 identifies the one or more text characters from the image. In an embodiment, the image processing service 110 analyzes pixels that make up the image to identify the one or more text characters from the image. For instance, the image processing service 110 may implement OCR techniques to identify features, such as lines, shapes, and other marks, within the image that may represent text characters that make up words.

Figure 4:
FIG. 4 depicts an example image that contains embedded text characters received by an image classification subsystem for image classification, in an embodiment.

FIG. 4 depicts an example image, which contains embedded text characters, received by the image classification subsystem 105 for image classification. Image 405 may contain embedded text 410 and graphical features 415. The embedded text 410 may be printed text superimposed onto the graphical features 415 of image 405 or may be freeform marks, such as handwritten lines or shapes, that have been superimposed onto the graphical features 415. In one example, the image processing service 110 may analyze image 405 for features corresponding to embedded text. The image processing service 110 may identify the embedded text 410 from the image 405 using OCR.

In operation 315, process 300 determines a text vector that is a numerical representation of the one or more embedded text characters. In an embodiment, the text vector generation service 120 may receive, as input, the identified one or more embedded text characters. The text vector generation service 120 may implement a machine learning model configured to generate a text vector that represents a numerical representation of sets of characters from the embedded text characters. The text vector represents a vector within a defined vector space. The vector space defined by the machine learning model may plot vectors of similar sets of characters, representing words that share a common context, closer in proximity. Vectors representing dissimilar sets of characters are plotted further apart within the vector space.

In operation 320, process 300 determines an image vector that is a numerical representation of the image. In an embodiment, the image vector generation service 125 may receive, as input, the graphical portion of the image, which includes the graphical features that make up the image. The image vector generation service 125 may determine a representative image vector for the image using a trained machine learning model, that has been trained using a training set of classified images. In one example, the machine learning model may be a convolutional neural network such as Inception-V3. Other examples of the machine learning model may be based on various other types of neural networks trained to classify images based upon pixels that make up the input image. In an embodiment, output of the image vector generation service 125 may be an image vector that represents a numerical representation of the image within a vector space. For example referring to FIG. 4, the image vector generation service 125 may receive the graphical features 415 of image 405. The image vector generation service 125 may process the pixels that make up the graphical features 415 and may generate an image vector, such as [$V_1, V_2 \ldots V_N$], where the values within the image vector represent numerical values for each of the different dimensions within the vector image space. Each dimension may represent one or more pixels of the image 405.

Multi-Modal Vector

In operation 325, process 300 processes the text vector and the image vector to generate a multi-modal vector that contains information from the text vector and the image vector. In an embodiment, the multi-modal vector generation service 130 may receive, as input, the text vector representing the embedded text from the image and the image vector representing graphical features from the image.

Concatenation

In an embodiment, the multi-modal vector generation service 130 may be configured to generate the multi-modal vector by concatenating the image vector and the text vector to generate the multi-modal vector. For example, the image vector may be represented as [$V_1, V_2 \ldots V_N$], where N equals the number of dimensions within the image vector space. The text vector may be represented as [$T_1, T_2 \ldots T_M$], where M equals the number of dimensions within the text vector space. The multi-modal vector generation service 130 may concatenate the image vector and the text vector to generate the multi-modal vector as [$V_1, V_2, \ldots V_N, T_1, T_2 \ldots T_M$], where the image vector values map to the image vector space and the text vector values map to the text vector space. In an embodiment, the generated multi-modal vector may be associated and stored with the image in the data repository 140.

Auto-Encoding

In an embodiment, the multi-modal vector generation service 130 may be configured to generate the multi-modal vector by implementing a machine learning model configured to determine values of the multi-modal vector from the image vector and the text vector. A deep neural network, such as an autoencoder neural network, may be implemented for generating the multi-modal vector that is mapped to a single vector space. For instance, the autoencoder 205 may be used to combine values from the input text vector 215 and the input image vector 210 together, based on a common vector space. As described, the autoencoder 205, once trained, may be configured to receive the input text vector 215 and the input image vector 210 and output the multi-modal representation 230 as a multi-modal vector of values that representing different dimensions within a common vector space. In an embodiment, the generated multi-modal vector may be associated and stored with the image in the data repository 140.

Image Classification

In operation 325, process 300 may classify the image into one of a plurality of image classifications. In an embodiment, the image classifier 150 may communicate with the data repository 140 to access a plurality of image classifications. In an embodiment, the plurality of image classifications may be stored, within the data repository 140, as data objects that contain classification properties that describe each image classification. For example, an image classification may have an associated array of image features with associated numerical values. The combination of numerical values associated with the array of image features may be used to describe classification properties of a particular image classification. In another example, each image classification may be associated with a multi-modal vector that contains numerical representations that describe classification properties of the particular image classification.

Upon retrieving the plurality of image classifications from the data repository 140, the image classifier 150 may use the classification properties of the plurality of image classifications to train a machine learning model to classify input images. For example, the classification properties may be a plurality of multi-modal vectors that each contain property values for features of images associated with the respective image classifications. The image classifier 150, once trained, may be used to classify input images based upon their associated multi-modal vectors. Upon determining a match with a particular image classification, the image classifier 150 may assign the particular image classification to the image. In an embodiment, the image classifier 150 may store the assignment of image classification to the image within the data repository 140.

In an embodiment, downstream systems, such as content management platforms, may access the image classifications of images from the data repository 140 in order to determine whether images are suitable for presentation to users. For instance, if an image is classified as NSFW, then the content management platform may determine that the image should not be presented within a user's feed. Conversely, if an image is classified as a meme, or any other approved classification, then the content management platform may allow presentation of the image and may even elevate an associated image rank for the image. In other embodiments, image classifications may be used to select and rank images based upon their classification type and user classification preferences. For instance, if a user prefers classifications X and Y over other image classifications, then the content management platform may assign higher rankings to images that are classified as either X or Y for the specific user. The higher ranked images may then be displayed within the specific user's feed over other images.

Image Search

Upon using the image classification subsystem 105 to classify a plurality of images, the image search engine 160 may be used to perform image searches using the assigned image classifications. In an embodiment, the image search engine 160 may receive a search request for a search of a particular image or image type. The search request may include one or more search keywords. If the search request includes one or more search keywords, then the image search engine 160 may search for classified images based upon the classification properties. For example, if the search keywords include "car rental services", then the image search engine 160 may search for keyword values associated with image classifications that are related to "car rental services". If keyword values of one or more image classifications match "car rental services" then the image search engine 160 may return, within a result set, images that have been associated with the one or more image classifications that match "car rental services".

Near Duplicate Image Detection

The duplicate detection engine 170 may be used to determine whether an image is a duplicate or near duplicate of an already classified image. In an embodiment, the duplicate detection engine 170 may receive a request to determine whether an input image is a near duplicate of an already classified image. Upon receiving the request, the duplicate detection engine 170 may send a request to the image classification subsystem 105 to generate a multi-modal vector representation of the input image. The image classification subsystem 105 may determine a multi-modal vector representation of the input image by performing operations described in FIG. 3.

In an embodiment, the duplicate detection engine 170 may implement a machine learning model that is configured to detect whether an input image is a near duplicate of one of the plurality of classified images based upon an associated multi-modal vector of the input image. The machine learning model of the duplicate detection engine 170 may be trained using a plurality of multi-modal vectors of the plurality of classified images. Upon receiving the multi-modal vector associated with the input image, the duplicate detection engine 170 may compare the values of the multi-modal vector against values of the machine learning model. For example, the machine learning model may perform a cosine similarity between values of the input multi-modal vector and values of stored multi-modal vectors from classified images. In other examples, the duplicate detection engine 170 may be configured to implement other vector comparison techniques to determine whether the input multi-modal vector of the input image is a near duplicate of a classified image. One or more similarity thresholds may be used by the duplicate detection engine 170 to determine whether two multi-modal vectors are near duplicates. For instance, if a number of values within the multi-modal vector for the input image are within a range of values based on the similarity thresholds then the duplicate detection engine 170 may determine that the input image is a near duplicate of an already classified image.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
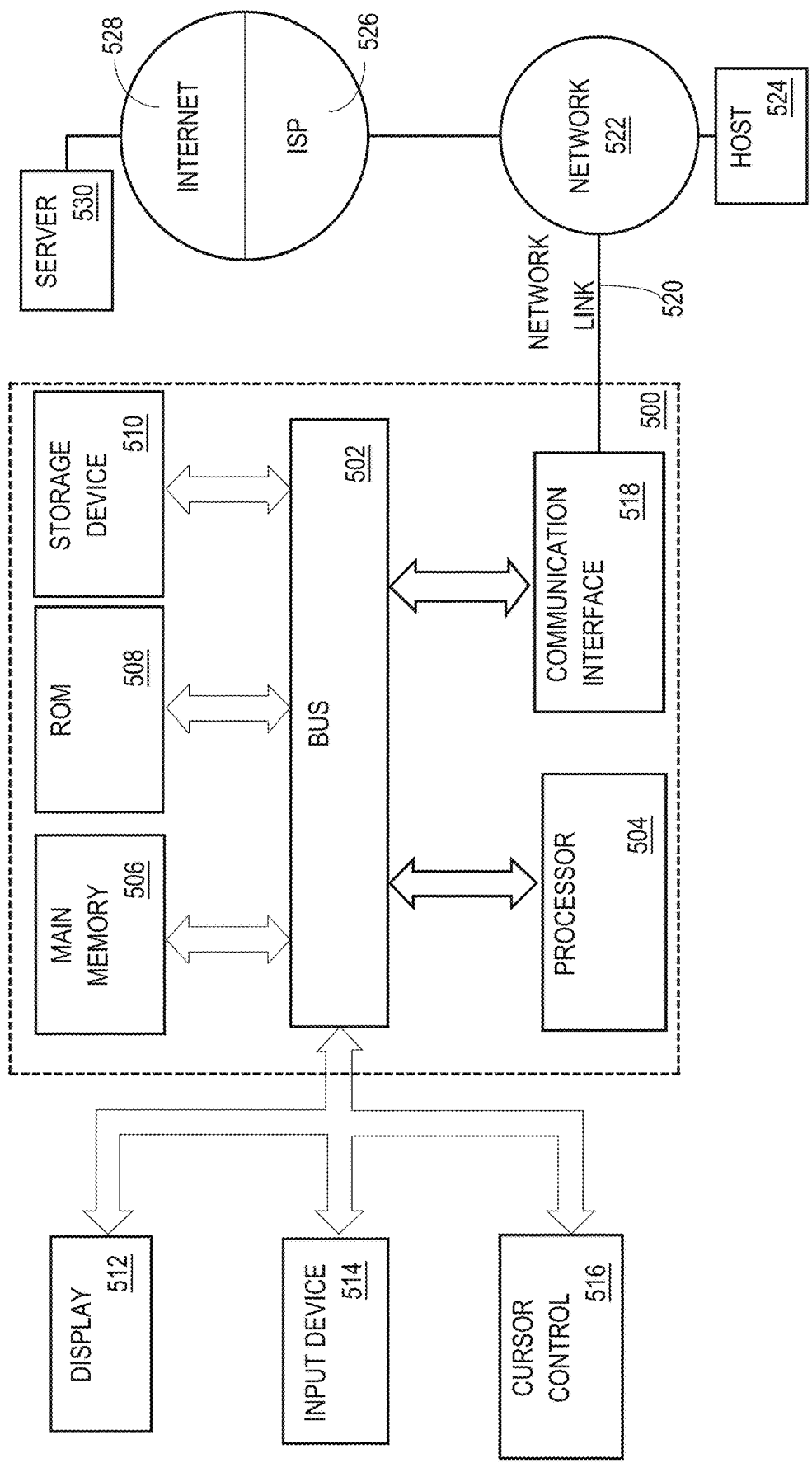
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving an image comprising one or more embedded text characters and graphical content;
   identifying the one or more embedded text characters from the image;
   receiving the one or more embedded text characters by a first machine learning model;
   generating, by the first machine learning model, a text vector that is a numerical representation of the received one or more embedded text characters within a text vector space created by training the first machine learning model on a text corpus;
   receiving the graphical content by a second machine learning model;
   generating, by the second machine learning model, an image vector that is a numerical representation of the received graphical content within an image vector space created by training the second machine learning model on a set of images;
   receiving the text vector and the image vector at an input layer of a neural network;
   generating, by one or more fully connected layers of the neural network, a text training vector and an image training vector;
   training the neural network on the text training vector and the image training vector;
   generating, by the trained neural network, a multi-modal vector containing information from the text vector and the image vector;
   based on the multi-modal vector, classifying the image into one of a plurality of image classifications; and
   wherein the method is performed by one or more computing devices.

2. The computer-implemented method of claim 1, wherein identifying the one or more embedded text characters from the image comprises using optical character recognition (OCR) to identify the one or more embedded text characters from the image.

3. The computer-implemented method of claim 1, wherein generating the multi-modal vector comprises:
   concatenating the text vector to the image vector to generate the multi-modal vector;
   wherein the multi-modal vector represents the image vector within an image vector space and the text vector within a text vector space.

4. The computer-implemented method of claim 1, further comprising:
   comparing values of the multi-modal vector of the image to a plurality of second multi-modal vectors corresponding to a plurality of second images; and
   determining that the image is a near duplicate of one or more second images of the plurality of second images by determining that values of the multi-modal vector are within a similarity threshold to one or more second multi-modal vectors of the plurality of second multi-modal vectors corresponding to the one or more second images.

5. The computer-implemented method of claim 1, further comprising:
   receiving a search request, comprising one or more search keywords, for one or more particular images;

comparing the one or more search keywords to values associated with the plurality of image classifications;
determining that the one or more search keywords match values of one or more image classifications of the plurality of image classifications; and
generating an image result set comprising images that have been classified as one of the one or more image classifications that match the one or more search keywords.

6. The computer-implemented method of claim 1, wherein the first machine learning model is configured to output a vector representation of a set of characters where similar sets of characters are located close together within a vector space and dissimilar sets of characters are located far apart within the vector space.

7. The computer-implemented method of claim 1, wherein the second machine learning model is a convolution neural network.

8. The method of claim 1, wherein the plurality of image classifications includes a first image classification and a second image classification that is different than the first image classification, wherein the first image classification is one or more of promotional, meme, or not-suitable-for-work.

9. The method of claim 1, wherein the image is a first image that is different than a second image, wherein the first image is classified into a first image classification and the second image is classified into a second image classification, the method further comprising:
based on the first image being classified into the first image classification, omitting the first image from content feeds of a plurality of users without considering preferences associated with the plurality of users;
based on the second image being classified into the second image classification, for each user in the plurality of users, determining, based on one or more preferences of said each user, whether to include the second image into a content feed of said each user.

10. The computer-implemented method of claim 1, wherein processing the text vector and the image vector to generate the multi-modal vector, comprises:
providing, as input, the text vector and the image vector to a third machine learning model as input, wherein the third machine learning model is an artificial neural network configured to output a multi-modal vector that represents both the text vector and the image vector within a single vector space; and
generating, by the third machine learning model, output comprising the multi-modal vector of the text vector and the image vector.

11. The computer-implemented method of claim 10, further comprising:
training the third machine learning model by processing a set of classified images to adjust weight parameters used by the third machine learning model, wherein adjustment of the weight parameters is based upon a least squared errors loss function.

12. The computer-implemented method of claim 10, wherein the third machine learning model is an autoencoder neural network.

13. A system comprising:
one or more computer processors;
an image classification platform coupled to the one or more processors, wherein the image classification platform performs operations comprising:
receiving an image comprising one or more embedded text characters and graphical content;
identifying the one or more embedded text characters from the image;
receiving the one or more embedded text characters by a first machine learning model;
generating, by the first machine learning model, a text vector that is a numerical representation of the received one or more embedded text characters within a text vector space created by training the first machine learning model on a text corpus;
receiving the graphical content by a second machine learning model;
generating, by the second machine learning model, an image vector that is a numerical representation of the received graphical content within an image vector space created by training the second machine learning model on a set of images;
receiving the text vector and the image vector at an input layer of a neural network;
generating, by one or more fully connected layers of the neural network, a text training vector and an image training vector;
training the neural network on the text training vector and the image training vector;
generating, by the trained neural network, a multi-modal vector containing information from the text vector and the image vector;
based on the multi-modal vector, classifying the image into one of a plurality of image classifications.

14. The system of claim 13, wherein identifying the one or more embedded text characters from the image comprises using optical character recognition (OCR) to identify the one or more embedded text characters from the image.

15. The system of claim 13, wherein generating the multi-modal vector comprises:
concatenating the text vector to the image vector to generate the multi-modal vector;
wherein the multi-modal vector represents the image vector within an image vector space and the text vector within a text vector space.

16. The system of claim 13, wherein the image classification platform performs further operations comprising:
comparing values of the multi-modal vector of the image to a plurality of second multi-modal vectors corresponding to a plurality of second images; and
determining that the image is a near duplicate of one or more second images of the plurality of second images by determining that values of the multi-modal vector are within a similarity threshold to one or more second multi-modal vectors of the plurality of second multi-modal vectors corresponding to the one or more second images.

17. The system of claim 13, wherein processing the text vector and the image vector to generate the multi-modal vector, comprises:
providing, as input, the text vector and the image vector to a third machine learning model as input, wherein the third machine learning model is an artificial neural network configured to output a multi-modal vector that represents both the text vector and the image vector within a single vector space; and
generating, by the third machine learning model, output comprising the multi-modal vector of the text vector and the image vector.

18. The system of claim 17, wherein the image classification platform performs further operations comprising:
training the third machine learning model by processing a set of classified images to adjust weight parameters used by the third machine learning model, wherein adjustment of the weight parameters is based upon a least squared errors loss function.

19. The system of claim 17, wherein the third machine learning model is an autoencoder neural network.

20. A computer program product comprising:
one or more non-transitory computer-readable storage media comprising instructions which, when executed by one or more processors, cause:
receiving an image comprising one or more embedded text characters and graphical content;
identifying the one or more embedded text characters from the image;
receiving the one or more embedded text characters by a first machine learning model;
generating, by the first machine learning model, a text vector that is a numerical representation of the received one or more embedded text characters within a text vector space created by training the first machine learning model on a text corpus;
receiving the graphical content by a second machine learning model;
generating, by the second machine learning model, an image vector that is a numerical representation of the received graphical content within an image vector space created by training the second machine learning model on a set of images;
receiving the text vector and the image vector at an input layer of a neural network;
generating, by one or more fully connected layers of the neural network, a text training vector and an image training vector;
training the neural network on the text training vector and the image training vector;
generating, by the trained neural network, a multi-modal vector containing information from the text vector and the image vector;
based on the multi-modal vector, classifying the image into one of a plurality of image classifications.

* * * * *